United States Patent
Orton et al.

(10) Patent No.: US 9,521,243 B2
(45) Date of Patent: Dec. 13, 2016

(54) DEVICES, SYSTEMS AND METHODS FOR ENABLING NETWORK CONNECTIVITY

(71) Applicant: USHAHIDI, INC., Orlando, FL (US)

(72) Inventors: Reginald Orton, Barrie (CA); Erik Hersman, Nairobi (KE); Philip Walton, Nairobi (KE); Emmanuel Kala, Nairobi (KE); Jonathan Shuler, Yorba Linda, CA (US); Nathaniel Manning, San Francisco, CA (US); David Kobia, Smyrna, GA (US)

(73) Assignee: Ushahidi, Inc., Orlando, FL (US)

( * ) Notice: Subject to any disclaimer, the term of this patent is extended or adjusted under 35 U.S.C. 154(b) by 0 days.

(21) Appl. No.: 14/774,978

(22) PCT Filed: Mar. 14, 2014

(86) PCT No.: PCT/US2014/028923
§ 371 (c)(1),
(2) Date: Sep. 11, 2015

(87) PCT Pub. No.: WO2014/144493
PCT Pub. Date: Sep. 18, 2014

(65) Prior Publication Data
US 2016/0028877 A1    Jan. 28, 2016

Related U.S. Application Data

(60) Provisional application No. 61/798,533, filed on Mar. 15, 2013.

(51) Int. Cl.
*H04M 1/725* (2006.01)
*H04W 52/02* (2009.01)
(Continued)

(52) U.S. Cl.
CPC .......... *H04M 1/72563* (2013.01); *H04W 8/22* (2013.01); *H04W 24/02* (2013.01);
(Continued)

(58) Field of Classification Search
CPC ...... H04L 67/02; H04L 51/24; H04L 12/1407; H04L 65/60; H04L 65/80; H04L 12/1845; H04L 61/2069; H04L 51/046; H04W 4/06; H04W 12/00; H04W 8/12; H04N 19/176; G06Q 30/0267; G06Q 20/382; G06Q 20/401; G06Q 20/327
(Continued)

(56) References Cited

U.S. PATENT DOCUMENTS

2005/0078672 A1* 4/2005 Caliskan ................. H04L 45/42
370/389
2006/0111909 A1    5/2006 Maes
(Continued)

OTHER PUBLICATIONS

International search report and written opinion dated Sep. 16, 2015 for PCT Application No. US2014/028923.

*Primary Examiner* — Phuoc H Doan
(74) *Attorney, Agent, or Firm* — Wilson Sonsini Goodrich & Rosati

(57) ABSTRACT

Techniques, including systems, devices and methods, for enabling network connectivity are described. In particular, systems, devices and methods for flexibly configuring network connections for reliability and/or extensibility are described. Such techniques include improving reliability of network connections by adaptively utilizing multiple network and electrical power configurations. The disclosed techniques also include enabling user-definable network functionality through a variety of methods.

30 Claims, 8 Drawing Sheets

(51) Int. Cl.
  *H04W 8/22*   (2009.01)
  *H04W 24/02*  (2009.01)
  *H04W 48/18*  (2009.01)

(52) U.S. Cl.
  CPC ....... *H04W 48/18* (2013.01); *H04W 52/0261* (2013.01); *H04W 52/0296* (2013.01); *Y02B 60/50* (2013.01)

(58) Field of Classification Search
  USPC ..... 455/418, 433, 435.1; 370/389; 340/5.73, 340/5.51; 709/203, 206; 706/46
  See application file for complete search history.

(56) References Cited

U.S. PATENT DOCUMENTS

| | | |
|---|---|---|
| 2006/0139148 A1* | 6/2006 | Faro .................. G07C 9/00103 340/5.73 |
| 2006/0152087 A1 | 7/2006 | De Oliverira Kastrup Pereira |
| 2006/0156365 A1 | 7/2006 | Zhang |
| 2007/0042767 A1 | 2/2007 | Stepanian |
| 2009/0116404 A1 | 5/2009 | Mahop |
| 2009/0300100 A1 | 12/2009 | Freer |
| 2010/0324845 A1 | 12/2010 | Spanier |
| 2011/0130887 A1 | 6/2011 | Ehlers, Sr. |
| 2012/0036282 A1 | 2/2012 | Chen |
| 2012/0110111 A1 | 5/2012 | Luna |
| 2013/0067059 A1 | 3/2013 | Gatta |

* cited by examiner

DEVICES, SYSTEMS AND METHODS FOR ENABLING NETWORK CONNECTIVITY

CROSS-REFERENCE

This application is a U.S. National Phase Application under 35 U.S.C. §371 of International Application No. PCT/US2014/028923, filed Mar. 14, 2014, which claims the benefit of U.S. Provisional Application No. 61/798,533, filed Mar. 15, 2013, the entire content of which is incorporated herein in its entirety.

BACKGROUND OF THE INVENTION

Networks and network connectivity are playing an ever-increasing role in the global economy. Networks, such as the Internet, and the efficiency and/or reliability of the associated connections, are crucial to the advancement of modern science, technology and industry. A significant and growing component of technological, scientific and industrial advancement occurs in developing and newly industrialized countries where such networks are sporadic, underprovisioned, unreliable or otherwise suboptimal. In many of such countries, other utilities, such as electrical utilities, are similarly suboptimal. The combined infrastructural inefficiency in such areas conspires to make consistent and reliable network connectivity challenging, which directly and indirectly affects the rate of technological, scientific and industrial innovation and productivity reliant thereon.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
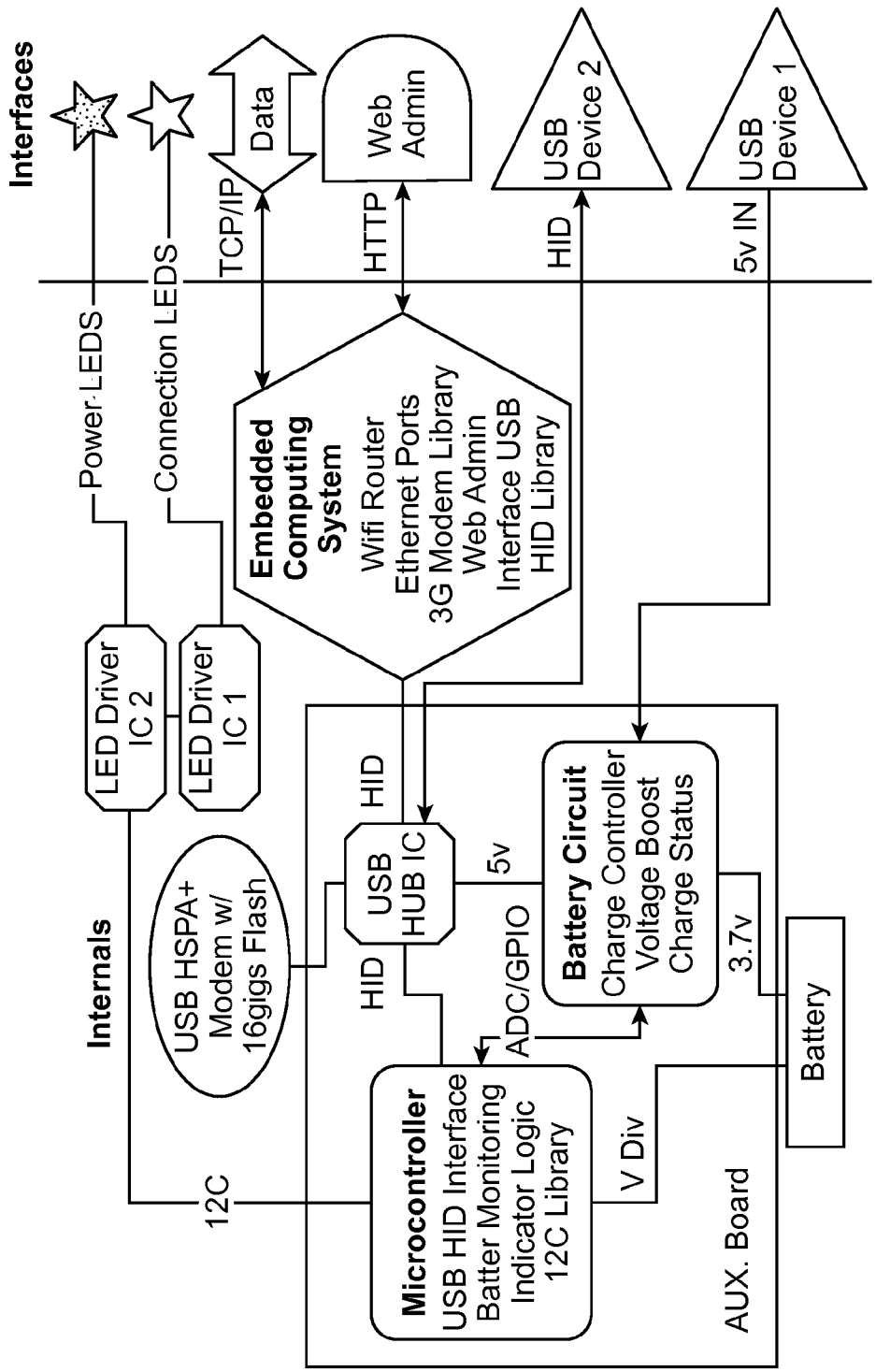
FIG. 1 diagrammatically illustrates an example device for enabling network connectivity in accordance with some embodiments.

Techniques described, suggested and implied herein include systems, methods and devices for interfacing with, enabling and/or generating one or more computer networks. Networks, as used herein, refer to one or more data connections between two or more devices, whether physical or virtual. Examples of such networks include local area networks (LANs), wide area networks (WANs), virtual private networks (VPNs), the global communications network known as the Internet, and so on. Such networks may have any combination of physical and virtual components, and may be wired, wireless or some combination thereof.

The techniques described include, for example, a device for optimizing network connectivity with little or no intervention from a user thereof. For example, such a device may serve as a gateway and/or network router, e.g., an interstitial device for directing and managing traffic between one or more connected user devices and one or more external networks, such as the Internet. The device includes, in some embodiments, various provisions for storing and/or caching data from/to the external network(s) and/or user devices. The device may also include a plurality of external network interfaces, and in some of such embodiments, may be capable of switching between such external network interfaces upon detection that network connectivity to a subset of the external network interfaces has been lost or otherwise compromised. In some embodiments, the device may be capable of detecting an interruption of supply power and switch to a more viable supply, as well as make one or more changes to the network configuration to minimize effects to network connectivity.

Other examples include methods and systems for setup and configuration of network connectivity devices. For example, a network connectivity device may include logic that infers, based on a limited subset of inputs or responses to inquiries about the network and/or operating environment in which the device operates, sufficiently detailed information to configure the network connectivity device to provide some or all pertinent functionality, such as status reporting, external network connectivity, internal network connectivity, data security, data sharing and dissemination and the like. As another example, a network connectivity device may be configured using a user interface (UI) served from (or external to) the device, and/or using one or more application programming interfaces (APIs), web services or the like. In some embodiments, the network connectivity device may support one or more software programs or applications ("apps") to, for example, run in connection with (or in some embodiments, directly upon) the device, in order to flexibly enable additional functionality (such as integration with data storage systems, other software applications, and the like).

An example network connectivity device may include, for example, functionality for automatically configuring the device to connect with mobile networks (e.g., cellular data networks). One example of such functionality includes determining, upon the insertion of a subscriber identity module (SIM) into the device for enabling connections to one or more mobile networks, one or more APNs to effect and configure such connections. In this example, if the requisite APN(s) are not available locally to the device, the device may query an external data store (e.g., a database) through an existing network connection with information relevant to the inserted SIM. If the database contains the appropriate APN(s), such APN(s) are relayed back to the device, whereupon the device may be configured to use the SIM, and thereon connect to the relevant mobile network(s). If the database does not contain the appropriate APN(s), a user of the device may be queried for additional information or, in some embodiments, instructed on how to manually enter the APN(s). Upon manual entry, if such manually entered APNs successfully enable the device to connect to the relevant mobile network(s), the manually entered APN(s) are stored in the database for future use by any similarly configurable network connectivity device connected therewith.

FIG. 1 is an illustrative block diagram of an exemplary network connectivity device in accordance with some embodiments. The components and functionality described may be implemented using any combination of appropriate components. In some embodiments, an embedded computing system enables various types of functionality, including routing of network traffic, wireless network access point(s) (e.g., via one or more applicable wireless networking standards such as IEEE 802.11ac, 802.11n and the like), wired networking (e.g., via IEEE 802.3ab-compliant Ethernet links over, for example, category 5, 5e or 6 cabling, and implementing a switch or hub), mobile data modem interface (e.g., modem firmware and/or drivers to enable networking via a connected or integral cellular data modem), web interface software such as web servers and/or API exposure, data bus connectivity and associated firmware (e.g., a Universal Serial Bus Human Interface Device (USB-HID) library), and the like. The embedded computing system may be proprietary, off-the-shelf (e.g., the Raspberry Pi), or some combination thereof. In some embodiments, the embedded computing system enables administration of other aspects of the device, e.g., through a Web-based administration interface. In some embodiments, the embedded computing system is connected to one or more peripheral devices, for example through a USB hub. In some embodiments, the embedded computing system provides network address translation (NAT), virtual private network (VPN) functionality, virtual LAN (VLAN) functionality, and other functionality using (and in some embodiments interposing between) an external network such as the Internet or an Intranet via, for example, TCP/IP, and one or more internal networks. The use of an embedded computing system enables a high degree of customizability as to the interaction and collective implementation of the interconnected componentry. For example, rather than merely configuring a connected wireless radio as an AP for the network, one may program the embedded computer to utilize the wireless radio and other required components as a wireless bridge, repeater, radio analyzer, and so forth. Thus, it is contemplated that the configurability afforded by the embedded computing system allow the network connectivity device to be flexibly programmed and/or adapted to serve purposes other than exemplarily described herein, but still within the spirit of this disclosure. Toward this end, exemplary embodiments may include external programmable interfaces, both hardware and software-based. For example, general purpose input/output pins of the microcontroller may be exposed for use by users of the device, as well as other data buses and/or lines (e.g., I2C, RS232 and the like), and in some cases with electrical outputs. An example application of such a data output would include direct connectivity between the network connectivity device and another computing device, such as a one-board computing system (e.g., Raspberry Pi), another network connectivity device, a server or the like.

In the illustrated example, the embedded computing system connects to peripheral devices through a USB hub, though other types of data busses and distribution devices are contemplated herewith. The illustrated example connects, via the USB hub, external USB ports for user-added devices (such as external hard disk drives and flash memory drives), one or more battery controllers, a wireless modem (for example, an HSPA+ data modem as illustrated, though any type of wireless modem is contemplated), and a microcontroller or system-on-a-chip (SoC). The external ports may enable a large variety of user-provided devices to extend the functionality of the overall network connectivity device, such as data storage, additional network interfaces for redundancy, security devices (e.g., authorization dongles), etc. The illustrated battery controller exemplarily includes functionality for monitoring and/or charging a battery connected therewith, as well as the ability to report status of the controller and/or the battery. The connected battery may be of any suitable type and/or chemistry, including lithium polymer (LiPo), lithium-ion, lithium iron phosphate (LiFePO4), nickel metal hydride (NiMH), sealed lead acid, nickel cadmium (NiCd), and so forth. The exemplary microcontroller connects, via USB-HID in another appropriate manner, to the embedded computing system, so as to enable externally facing feedback regarding the status of the network connectivity device. For example, the microcontroller may report the status of any connected battery back to the embedded computing system, as well as provide an interface for connected displays, lights, and so forth. Such connections may, as illustrated, be via I2C, or by any appropriate signaling or communication mechanism (e.g., RS-232, SPDIF, DVI, and so forth). In the example shown, the embedded computing system may use the microcontroller to display current status of the network connectivity device as a whole via one or more light-emitting diodes (LEDs). The example illustrated includes a wireless modem connected via USB to the embedded computing system. The wireless modem, may, such as illustrated, be High Speed Packet Access (HSPA/HSPA+) compatible, or may be compatible with any other mobile telephony protocol or data technology (and in some embodiments, may support multiple protocols). The exemplary illustration also includes provision for data storage (e.g., flash memory).

The network connectivity device, via its component functionalities, may be capable of creating and interfacing a plurality of networks. In some embodiments, the network connectivity device interchangeably uses the external networks (e.g., as illustrated, as connected through the wireless modem to a mobile broadband network and as connected through one or more Ethernet ports of the embedded computing system to an external wired network) to provide redundancy as between them. Thus, in embodiments where user devices utilize the network connectivity device to provide access to the external network(s), in the instance that one or more of the connected external network(s) fail or fall below a predetermined bandwidth or latency threshold, the network connectivity device may be configured or configurable to automatically "fail over" to another, still viable connection. In some embodiments, the network connectivity device may constantly or periodically poll and/or test the external network connections to determine which among them is optimal and/or disconnected, and automatically select the best available one.

The network connectivity device may, in some embodiments, provide a "fail over" or redundancy functionality with respect to electrical power. As exemplarily illustrated, the network connectivity device includes a battery and an external power connection (e.g., through USB). In scenarios where externally provided power is lost or becomes suboptimal in quality (e.g., brownouts or voltage spikes), the device may seamlessly switch to being powered by the internal battery until such time as the externally provided power resumes or operates within predetermined and/or nominal parameters. In some of such embodiments, the device may additionally determine that, based on the nature of the externally provided power, that one or more external networks may have (or will soon) lose at least some functionality, and preemptively (or reactively) switch to another external network (or interface) that has or is likely to have better connectivity.

Figure 2:
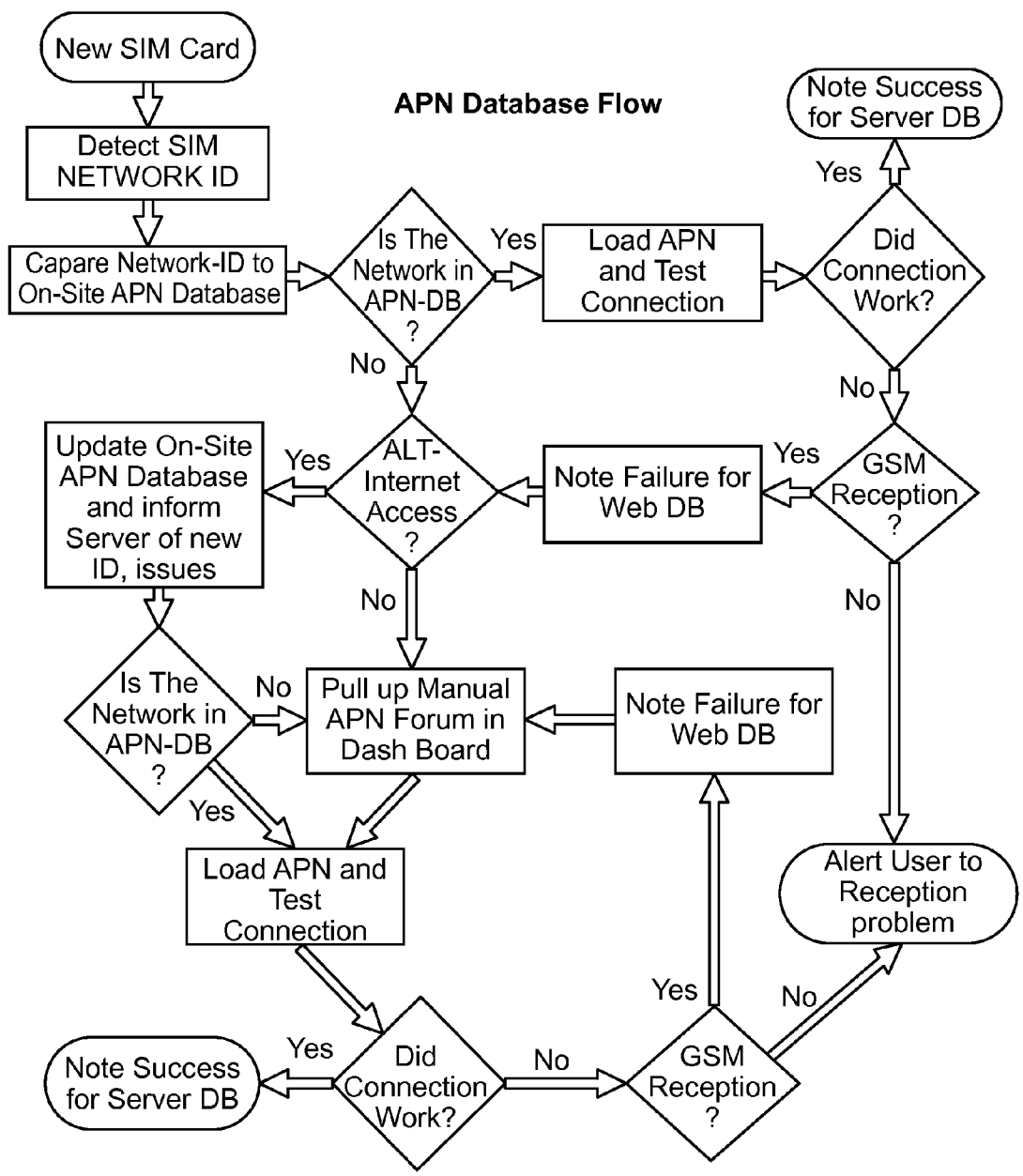
FIG. 2 illustrates an exemplary process for enabling and managing network connectivity with one or more networks using one or more access point names (APNs) in accordance with some embodiments.

FIG. 2 illustrates, in flowchart form, techniques for connecting to mobile networks requiring preconfiguration. The exemplary illustration is in the context of mobile networks requiring SIMs for access, but other types of mobile networks without such requirements (e.g., CDMA networks) or where SIMs are virtual, rather than physical, are also contemplated herein. In the illustrated example, upon the detection of a new SIM card, a network connectivity device detects one or more mobile network IDs associated with the SIM. (In some embodiments, such associated network IDs identify mobile networks compatible with the inserted SIM.) The detected network ID is compared against a database internal to the network connectivity device. If the network ID is found within the internal database, the network connectivity device is configured to use one or more of the associated APNs and the network connectivity device performs a connection test, e.g., a ping or bandwidth test, to a known good destination using such APNs. If the connection test is successful, the APN is noted as successful in the internal database as well as a remote database that may, for example, reside in a distributed or other external computing environment that is reachable by the network connectivity device through, e.g., the Internet. If the connection test is unsuccessful, the status of the underlying mobile network is determined (e.g., whether there a connection to a mobile network tower of the associated mobile network. If the mobile network is viable but, e.g., Internet connectivity is unavailable through the putatively configured mobile network, the device marks the APN as partially functional in the internal database (but with non-functioning Internet connectivity) and checks for the presence of an alternate Internet connection (e.g., through another known-good connection to the Internet as previously described) through which to also update the remote database noting that the subject APN is partially functional. Alternatively, the remote database is queried for any replacement, updated or alternate APNs previously known as fully functional. If such an APN exists, the replacement, updated or alternate APN is retrieved from the remote database and the network connectivity device is configured to use it. If no such replacement exists remotely, a user of the network connectivity device is alerted to configure the APN manually. Upon configuring any remotely retrieved replacement or manual APN, the Internet connection is tested again, and similarly to previously described, successes are marked both in the local database and the remote database, failures are noted locally (and, if possible, also in the remote database as to the nature of the failure), and reconfiguration is attempted and/or requested from a user of the network connectivity device. If at any point cellular/mobile reception is not detected, the user is directly alerted to the reception problem, and in some embodiments, given suggestions as to how to rectify the issue.

As previously noted, the embedded computing system may also provide administrative functions for the device, and in some embodiments, may externally expose such functionality through, for example, a built-in web server providing a UI, API(s), or both. FIGS. 3 through 8 illustrate an example UI for initial setup of a network connectivity device, as well as for ongoing administration and configuration. As illustrated, an exemplary network connectivity device may in some embodiments be configurable using a mobile device or any other entity capable of connecting with the network connectivity device (e.g., internally, over a LAN, via an Intranet, or via the Intranet). It is contemplated that in some embodiments, the level of control (and thus the number of configuration options exposed) may differ according to the connecting device, the credentials of an authenticating user, and/or the method of connection (e.g., someone connecting from within a network created by the network connectivity device may be afforded more control over the device's configuration than one connecting over the Internet). Configuration of the network connectivity device may, in some embodiments, be through a service of a distributed computing system, whereupon at a time after the configuration has been made or updated, an associated network connectivity device may receive the new or updated configuration asynchronously from the distributed computing system. Such a solution may be advantageous in that a plurality of network connectivity devices may be configured and/or administered from a central point, and without regard to the exact connectivity between the configuring agent and the network connectivity device to be configured.

Figure 3:
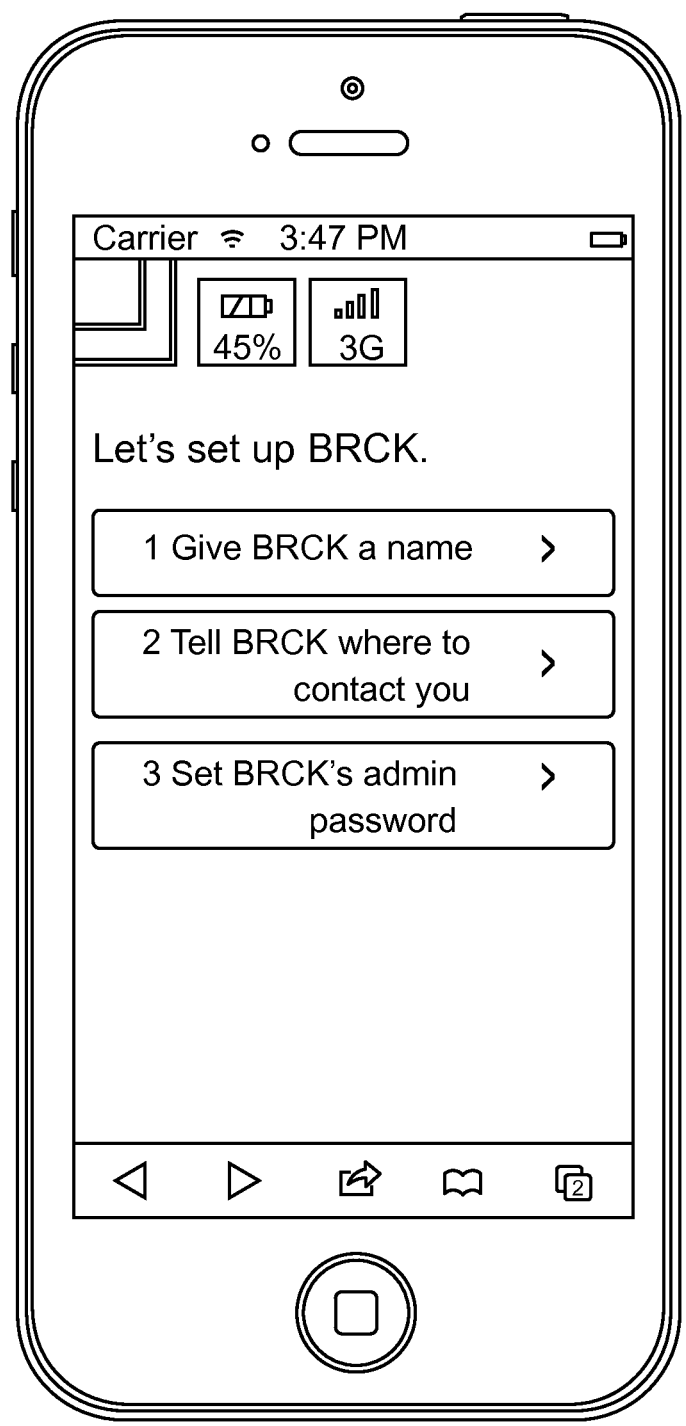
FIGS. 3-8 illustrate an exemplary user interface (UI) for configuring a network connectivity device in accordance with some embodiments.

FIG. 3 illustrates an example UI for initial configuration of a network connectivity device. In some embodiments, basic information is gathered so as to enable the device to begin functioning as intended, as well as to interact with a user (e.g., an administrator) to provide device status as well as to present iterative queries to the user/administrator to enhance and/or tailor the device's configuration. In some embodiments, certain queries, such as those designed to ascertain the intended use of the device, may be used to configure the device inferentially and/or presumptively, e.g., by enabling and/or disabling certain aspects of the device, or autoconfiguring internal and/or external networks.

Figure 4:
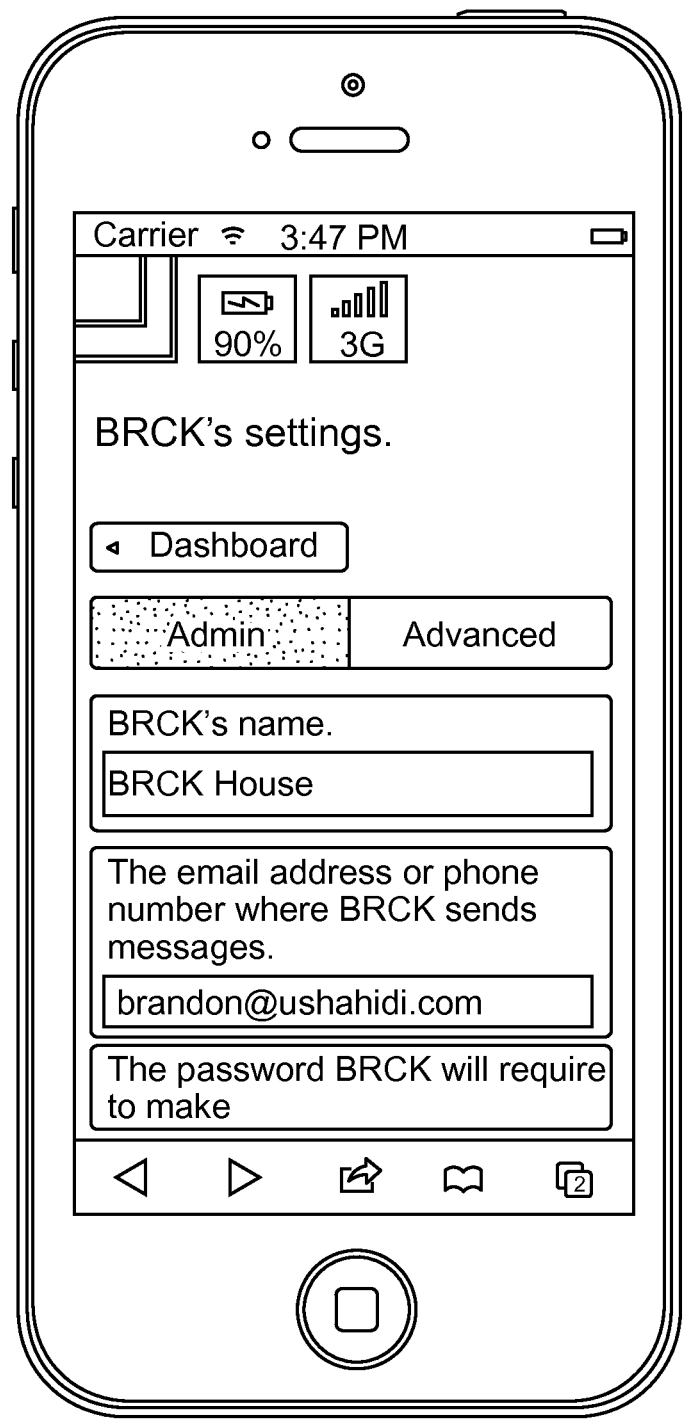

FIG. 4 illustrates an example UI for administering the device after initial configuration. The previously inferred or directly configured parameters are shown, as well as any additional functionality, e.g., permitted by the requesting entity's status as described above (e.g., network connection, user rights/roles, etc.)

Figure 5:
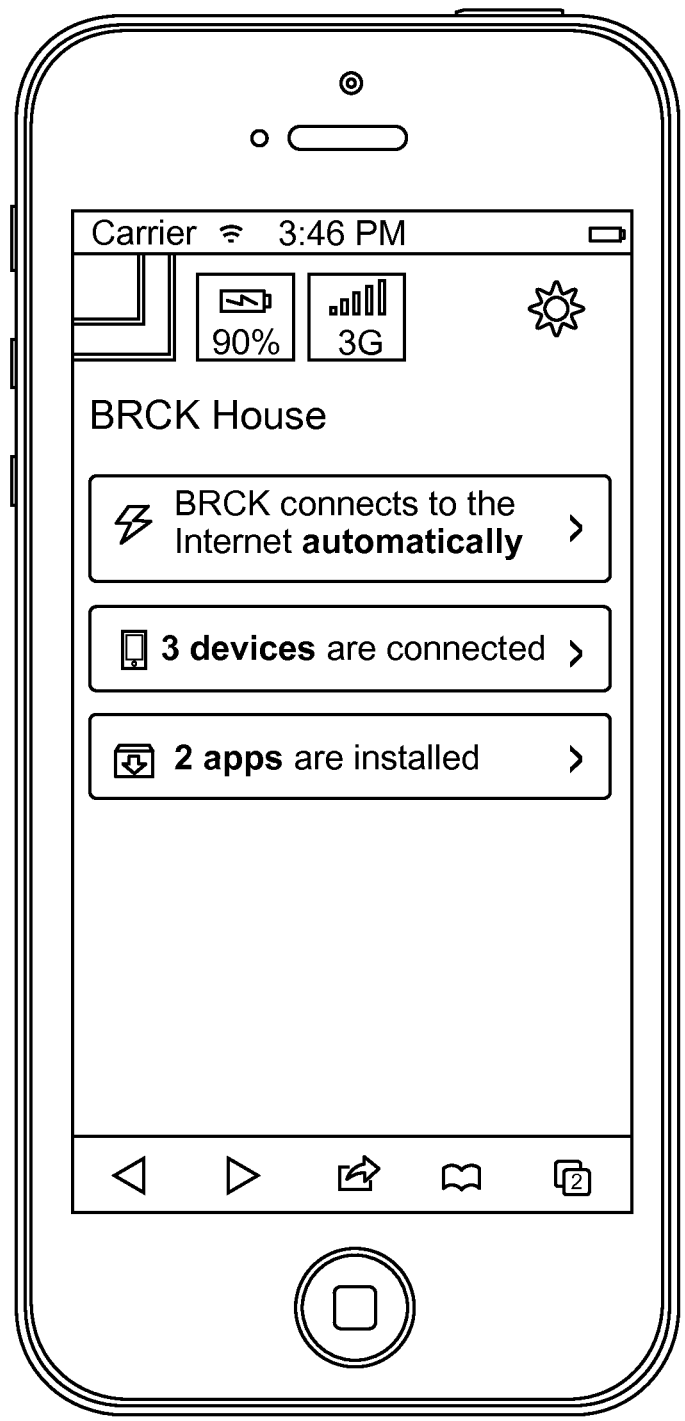
Figure 6:
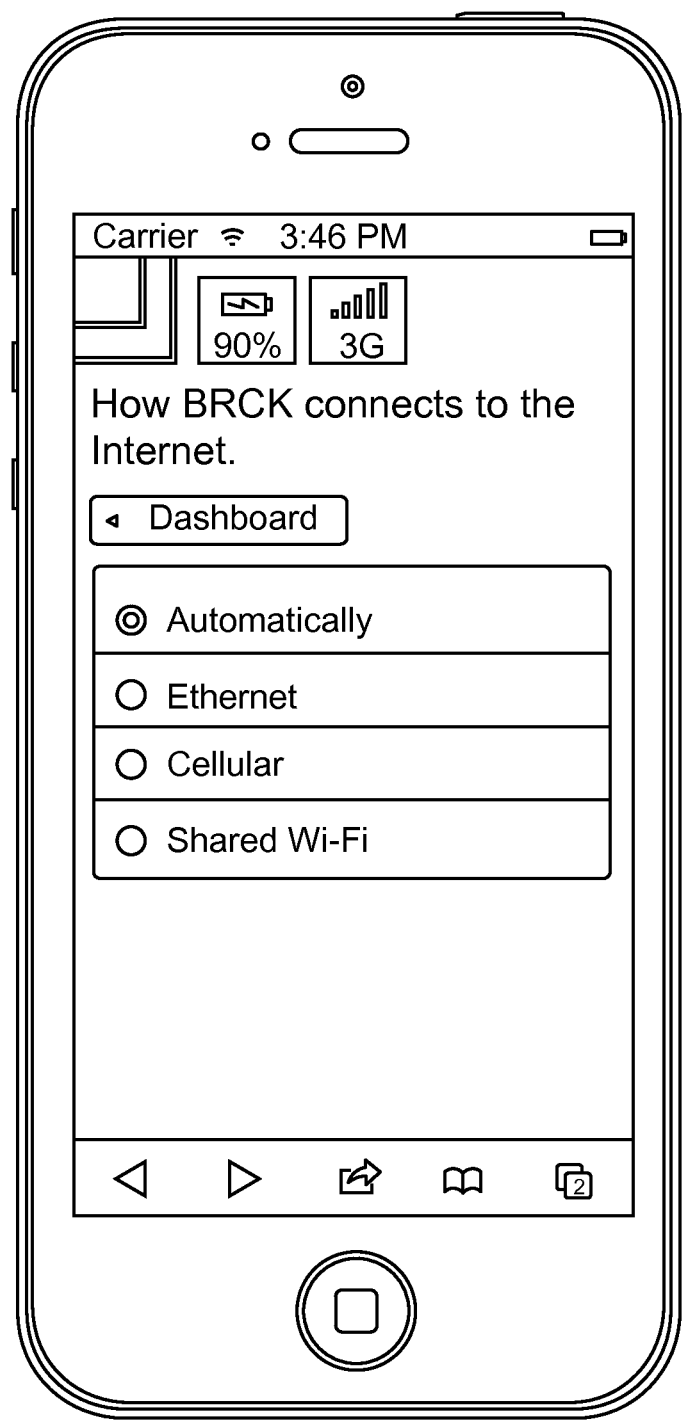
Figure 7:
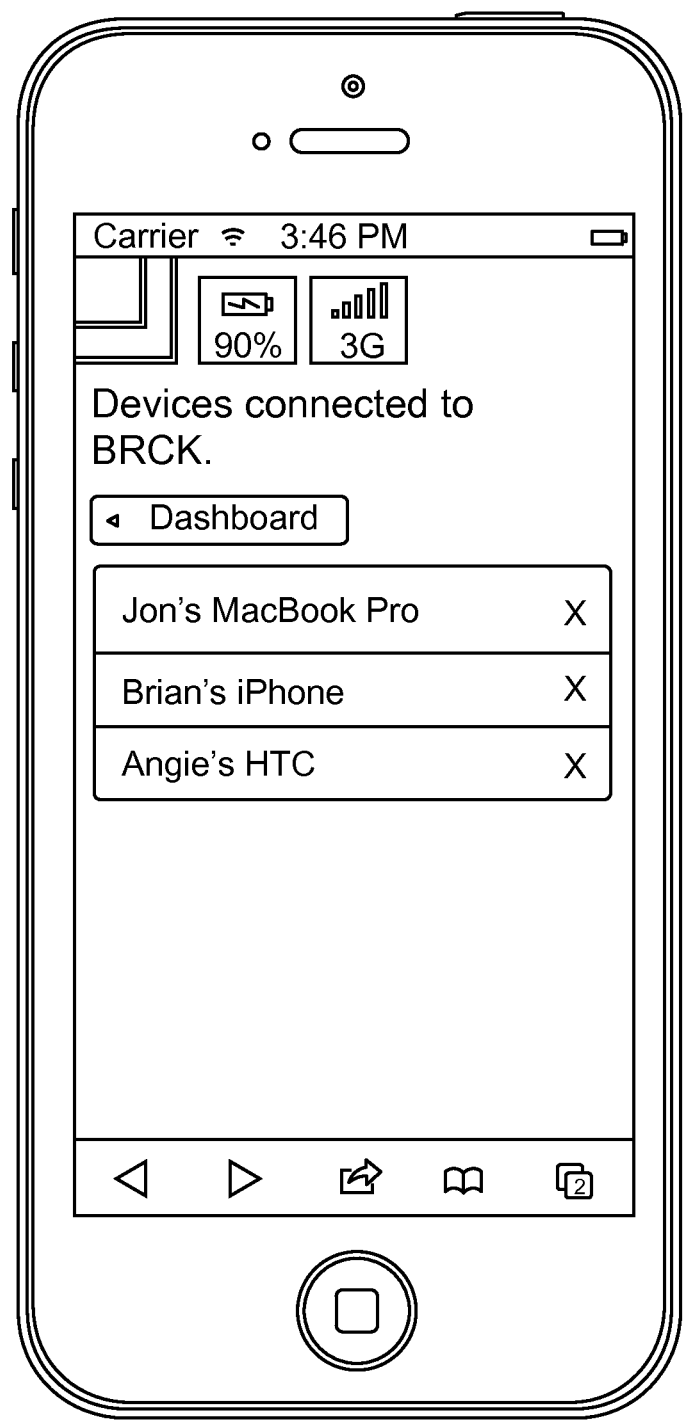

FIG. 5 illustrates an example UI for viewing and/or adjusting the operational characteristics of a network connectivity device. Such operational information may be passed from the individual components to the embedded computing system and thereupon exposed through a built-in web server, or, in some embodiments, exposed via a distributed computing system as described above (and in certain embodiments, aggregated with the operational parameters of other network connectivity devices). Similarly, any administrative tasks or configuration changes performed via, for example, UIs such as those illustrated in FIG. 6 (external network/Internet and fail over configuration) and FIG. 7 (administration of user devices associated with the network connectivity device) may be effected directly through the web server of the network connectivity device, or through an intermediary such as the distributed computing system previously described.

Figure 8:
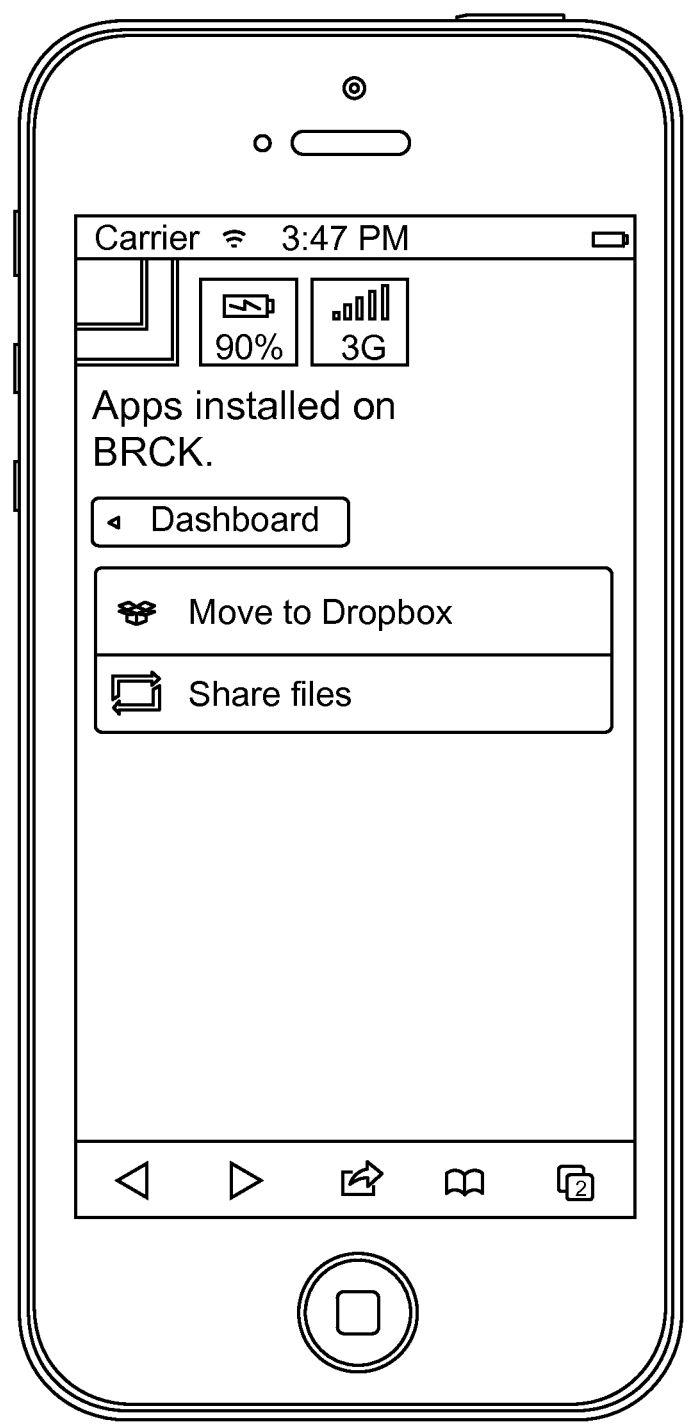

FIG. 8 illustrates an example UI for utilizing external applications for extending one or more functionalities of a network connectivity device. As previously mentioned, the embedded computing system is flexibly configurable, and, in some embodiments, is capable of running external code and user-provided software applications to alter or extend the functionality of the network connectivity device as a whole. Examples, such as those illustrated, include integration with external or "cloud" data storage providers, data security applications such as firewalls, VPN/VLAN capability, and so on. In some embodiments, the network connectivity device utilizes built-in (and/or externally connected) data storage such as flash memory to cache or store data transfers from connected user devices (automatically or upon demand of the user device). In an exemplary embodiment, an external application may be utilized to automatically or manually move such cached and/or stored devices to a "cloud" data storage provider (e.g., Dropbox). Such an arrangement is advantageous in scenarios where a user of the network connectivity device cannot reliably access the "cloud" data storage provider, and can temporarily store the data for later uploading from the network connectivity device when such access becomes feasible. Another example (as illustrated) is the use of an external application to provide network-attached storage (NAS) functionality to the device, whereupon user devices may cache and/or store data in flash memory associated with the network connectivity device as previously described, and such cached and/or stored data is made available via the external application to other user devices connected to the network connectivity device. It is contemplated that such external applications may be resident upon a memory of the network connectivity device itself or, in some embodiments, external to such memory (or the network connectivity device) and utilize one or more functions exposed through, e.g., an application programming interface (API) provided by the network connectivity device.

An exemplary API for a network connectivity device may include any externally queriable, addressable and/or modifiable aspect of the device. For example, an API for a network connectivity device as previously described may include commands to retrieve, log and or relay the location of the network connectivity device; direct communications via the network connectivity device (e.g., messages such as SMS and MMS through the mobile network connected thereto); storing, retrieving and/or relaying (e.g., to an external device) of data; retrieving and/or adjusting various operational parameters of a connected network (e.g., enabling 3G communications via WCDMA/LTE, forcing 2G communications via GPRS/EDGE, and/or assessing signal strength in some or all communications frequency bands), retrieving and/or logging power conditions (e.g., battery status, external power status, and logging/storage thereof); direct manipulation of hardware/microcontroller/embedded processor pinouts (e.g., GPIO, I2C, external power sources, RS232 interfaces); and the like.

The various techniques described herein may be partially or fully implemented using code that is storable upon storage media and computer readable media, and executable by one or more processors of a computer system. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A network connectivity device for use in low-resource environments, the device comprising:
   a plurality of external network interfaces each configured to connect to one of a plurality of external networks, at least a subset of the plurality of external networks having a first type and at least one of the external networks not in the subset of the plurality having a second type differing from the first type;
   at least one internal network interface configured to connect to one or more user devices;
   a power connection configured to power the network connectivity device, the power connection having at least a coupled external power source and a battery-based internal power source;

one or more processors configured to:
select, based on a detection by the one or more processors of quality of the external power source, at least one of the external power source or the internal power source for use by the power connection to power the network connectivity device;
select, based on quality of network functionality of each of the plurality of external networks, between at least the first and second type of the external networks, wherein the quality of network functionality is determined based at least in part on the detected quality of power, and wherein the detected quality of power enables the one or more processors to predict a future change in the quality of network functionality of at least one of the plurality of external networks; and
configure the internal network interface to connect the one or more user devices to the selected type of external network.

2. The device of claim 1, wherein the plurality of external network interfaces includes a mobile network interface, a WiFi network interface, and an Ethernet network interface.

3. The device of claim 1, further comprising an embedded computing system capable of controlling one or more functionalities of the network connectivity device.

4. The device of claim 3, wherein the embedded computing system includes an off-the-shelf computing device.

5. The device of claim 3, wherein the one or more functionalities include administrative functions and configurative functions.

6. The device of claim 5, wherein the administrative functions are exposed through a web-based user interface.

7. The device of claim 5, wherein the administrative functions are accessible from an external device connected to the network connectivity device.

8. The device of claim 5, wherein the administrative functions are accessible from an external device connected to a distributed computing system associated with the network connectivity device.

9. The device of claim 3, wherein the embedded computing system is configured to connect to one or more devices peripheral to the embedded computing system.

10. The device of claim 9, wherein the embedded computing system is configured to connect to the one or more peripheral devices using a USB connection.

11. The device of claim 9, wherein the one or more peripheral devices include a data storage device.

12. The device of claim 9, wherein the one or more peripheral devices include a wireless modem.

13. The device of claim 9, wherein the one or more peripheral devices include a battery controller associated with the battery-based internal power source.

14. The device of claim 9, wherein the one or more peripheral devices comprise an additional external network interface configured to connect to an external network having a third type differing from the first and second types, and wherein the one or more processors are configured to select between at least the first, second, and third types of the external networks.

15. The device of claim 3, wherein the embedded computing system is configured to run one or more external software applications.

16. The device of claim 15, wherein the one or more software applications comprise a data security application, a virtual private network (VPN) or virtual local area network (VLAN) application, or an application associated with an external data storage provider.

17. A method for providing network connectivity in low-resource environments, the method comprising:
connecting to a plurality of external networks using a plurality of external network interfaces, at least a subset of the plurality of external networks having a first type and at least one of the external networks not in the subset of the plurality having a second type differing from the first type;
receiving power from a power connection having at least a coupled external power source and a battery-based internal power source;
detecting quality of the power received from the coupled external power source;
selecting, based on the detected power quality, at least one of the external power source or the internal power source for use by the power connection to power the network connectivity device;
predicting, based at least in part on the detected quality of the power, one or more qualities of network functionality of at least a subset of the plurality of external networks;
selecting, based at least in part on the predicted qualities of network functionality, between at least the first and second type of the external networks; and
connecting one or more user devices to the selected type of external network.

18. The method of claim 17, further comprising:
detecting a decrease in the quality of network functionality of the selected type of external network; and
connecting the one or more user devices to the other type of external network.

19. The method of claim 17, wherein the quality of network functionality is determined by periodic polling of each of the plurality of external networks.

20. The method of claim 17, wherein the detected quality of the external power source includes detected occurrences of brownouts, voltage spikes, or interruptions of power provided by the external power source.

21. The method of claim 17, further comprising:
receiving data from at least some of the one or more user devices; and
storing the data in a data storage device.

22. The method of claim 21, wherein the stored data is transmitted to a remote data storage via the selected type of external network, at a time after the predicted quality of network functionality of the selected type of external network indicates that the selected type of external network supports the transmission.

23. The method of claim 22, wherein the data storage device is connected to the power connection.

24. The method of claim 22, wherein the remote data storage comprises data storage resources of a distributed computing data storage provider.

25. The method of claim 17, further comprising:
receiving data from at least some of the one or more user devices;
at a time after the quality of network functionality of the selected type of external network fails to meet a predetermined standard, storing the data in a local data storage; and
at a time after the quality of network functionality of the selected type of external network meets the predetermined standard, transferring the data from the local data storage to a remote data storage via the selected type of external network.

26. One or more non-transitory computer-readable storage media having collectively stored thereon executable instructions that, when executed by one or more processors, cause the one or more processors to at least:

connect to a plurality of external networks using a plurality of external network interfaces, at least a subset of the plurality of external networks having a first type and at least one of the external networks not in the subset of the plurality having a second type differing from the first type;

enable the receipt of power from a power connection having at least a coupled external power source and a battery-based internal power source;

select, based on a detection of quality of the external power source, at least one of the external power source or the internal power source for use by the power connection to power the network connectivity device;

select, based on quality of network functionality of each of the plurality of external networks, between at least the first and second type of the external networks, wherein the quality of network functionality is determined based at least in part on the detected quality of power, and wherein the detected quality of power enables prediction of a future change in the quality of network functionality of at least one of the plurality of external networks; and connect one or more user devices to the selected type of external network via an internal network interface.

27. The non-transitory computer-readable storage media of claim 26, wherein the executable instructions further cause the network connectivity device to at least:

determine, at a time after insertion of a subscriber identity module (SIM) into the network connectivity device, at least one mobile network associated with the SIM;

obtain, from an associated database, one or more access point names (APNs) associated with the at least one mobile network;

determine whether each of the one or more APNs are functional for enabling the one or more user devices to connect to the at least one mobile network; and record which of the one or more APNs are capable of enabling the one or more user devices to connect to the at least one mobile network in the associated database.

28. The non-transitory computer-readable storage media of claim 27, wherein the associated database is connected to the one or more processors.

29. The non-transitory computer-readable storage media of claim 27, wherein if none of the one or more APNs are functional for enabling the one or more user devices to connect to the at least one mobile network, the executable instructions further cause the processors to at least:

obtain, from the associated database, one or more replacement APNs previously determined to be functional for enabling the one or more user devices to connect to the at least one mobile network.

30. The non-transitory computer-readable storage media of claim 27, wherein the executable instructions further cause the processors to at least:

determine whether the at least one mobile network is functional for enabling the one or more user devices to connect to the Internet.

\* \* \* \* \*